July 2, 1935.  H. T. SCOTT  2,006,689
CONTAINER AND METHOD OF MAKING THE SAME
Filed Aug. 29, 1933   2 Sheets-Sheet 1
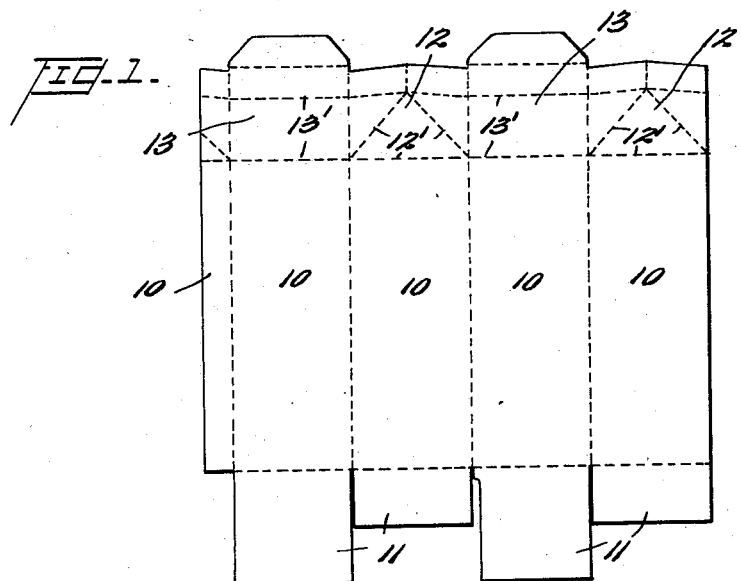
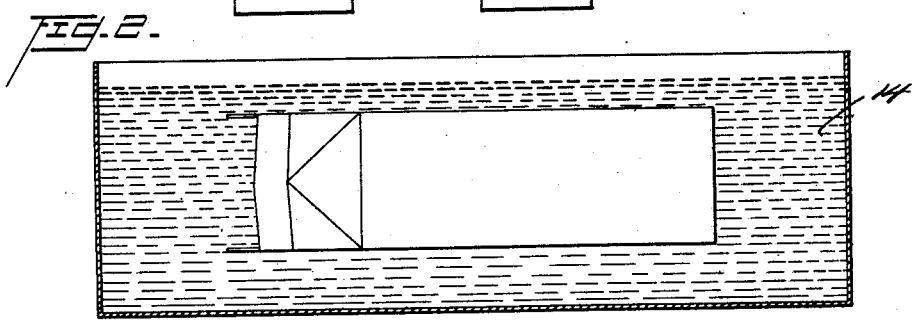
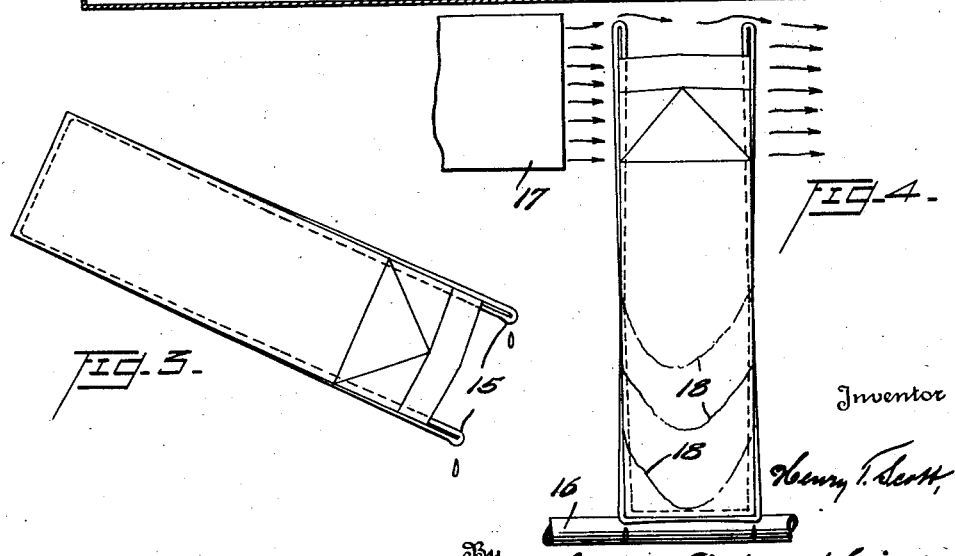

July 2, 1935.   H. T. SCOTT   2,006,689
CONTAINER AND METHOD OF MAKING THE SAME
Filed Aug. 29, 1933   2 Sheets-Sheet 2
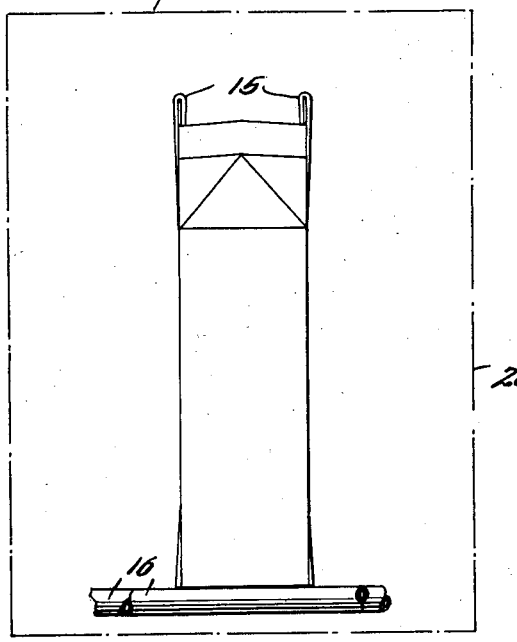
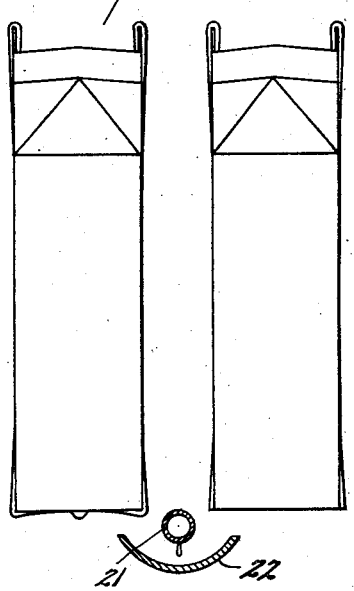
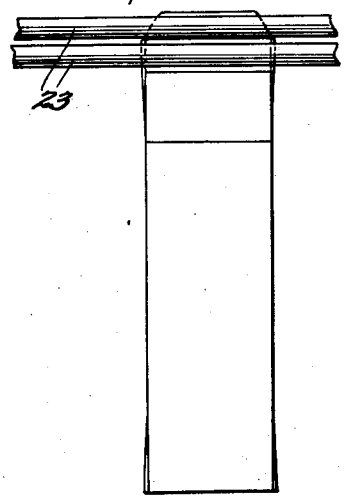
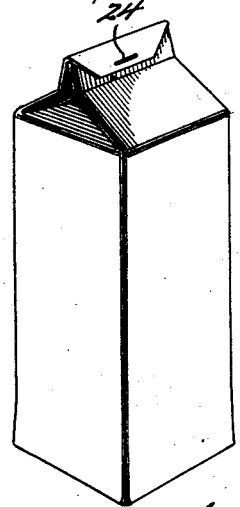
Inventor
Henry T. Scott,
By Watson, Coit, Morse & Grindle,
Attorneys Patented July 2, 1935

2,006,689

UNITED STATES PATENT OFFICE 2,006,689

CONTAINER AND METHOD OF MAKING THE SAME

Henry T. Scott, Toledo, Ohio, assignor to The American Paper Bottle Company, Toledo, Ohio, a corporation of Ohio Application August 29, 1933, Serial No. 687,381

11 Claims. (Cl. 93—6)

This invention relates to containers and to methods of making the same, particularly to sealed paper containers of the type adapted for use in the packaging of foodstuffs, such as milk, and other materials.

While the improved method may be employed in the manufacture of containers which vary widely in size and shape and which also to a certain extent may be formed of materials of different characteristics, it is particularly useful when employed in the fabrication of tubular containers of paper, such for instance as that disclosed in my copending application Serial No. 686,300, filed August 22, 1933. Such containers may be employed in numerous industries and in the packaging of various materials, including milk, and when employed in the packaging of foodstuffs, especially when employed in the packaging of milk, it is essential that they be fabricated in such manner as to be mechanically strong in order to withstand the shocks and abrasion incident to transportation and handling generally, as well as capable of withstanding the internal pressure of the liquids which they may contain, and also entirely impervious to the action of liquids.

Preferably the paper container is treated with a coating substance such as paraffin in order to strengthen its walls and to render them leakproof, and in application Serial No. 277,414, filed May 14, 1928, is disclosed an eminently satisfactory method of forming, coating, charging, and sealing a paper container of the type which I have found particularly useful in actual practice. The present invention contemplates a method of applying the coating substance to the container which differs in a number of respects from the method set forth in the application just referred to, it being my present object to provide a container which is mechanically stronger than the container which is the ultimate product of the method of the prior application and without additional cost, by reason of the novel distribution of the coating substance, and also a container in which a more perfect seal against leakage is obtained.

The improved method may be practiced in apparatus which differs widely in design, and the several steps of the method may naturally be modified and their sequence somewhat rearranged in adapting the same to the fabrication of containers which vary in shape and in the materials of which they are constructed. In the accompanying drawings a series of rather diagrammatic views illustrate, so far as possible, the essential steps employed in the fabrication of the container, that is, those steps with which the present method is particularly concerned.

In the drawings:

Figure 1 is a plan view of the developed blank from which the container is formed;

Figure 2 shows in section a tank of liquid coating substance, the container being immersed therein;

Figure 3 shows the container in the position in which it is held when the coating substance is being drained therefrom after immersion;

Figure 4 shows the container in upright position, the top portion undergoing a chilling action to rapidly congeal the coating substance upon such portion;

Figure 5 illustrates diagrammatically the container undergoing a further step in the process;

Figure 6 discloses the method of removing from the bottom of the container any excess coating material;

Figure 7 illustrates diagrammatically the further step of reheating the upper portion of the container just prior to a closing operation; and Figure 8 shows in perspective the completed container.

As heretofore explained, the improved method may be practiced in connection with containers of different types but will be hereinafter described as utilized and employed in the fabrication, coating, charging, and sealing of a container of the type disclosed in my copending application serial No. 686,300, filed August 22, 1933. The exect mechanical construction of the container may be fully understood and appreciated by referring to the aforementioned application, and it is only necessary to explain here that the preferred container is fabricated of paper, its four side walls, bottom and top originally comprising portions of a single blank, such for instance as indicated in Figure 1. In Figure 1 the side walls of the container are indicated by the numerals 10 and the bottom closure flaps at 11. Foldable extensions of the several side walls are indicated at 12 and 13 respectively, these portions comprising together a foldable end extension of the container and being adapted to be collapsed or folded after the container has been otherwise completely formed, coated, and charged so that the contents are completely enclosed and sealed. The completed container is shown in perspective in Figure 8 and is seen to be in the general form of an elongated tube, square in transverse section, with a flat bottom and top having upwardly inclined portions and a central vertically extending rib.

Prior to the application of the coating material an adhesive is applied to the bottom flaps 11 and to the side flap 10', and the blank is folded until it is in the form shown in Figures 2 to 7, inclusive, the foldable top portion being untouched and the several sections 12 and 13 thereof lying in the planes of the respective side walls. It will be understood that the lines 12' and 13' in Figure 1 and other figures of the drawings represent score lines, or lines of weakness, impressed in the paper when the blank is originally cut and along which lines the top extensions may be folded or collapsed when the top of the container is to be closed and sealed.

After these operations have been performed, the coating process may be carried out, and in the first step of this process the coating is applied uniformly to all surfaces of the container, preferably by immersion in a tank such as indicated in Figure 2. The coating materials employed may vary, depending upon the nature of the materials which are to be packed in the containers, but I have found in actual practice that paraffin is suitable for many purposes, and hence the liquid indicated in Figure 2 at 14 is a bath of molten paraffin. Paraffin is reduced to molten condition upon being raised to a temperature of approximately 136° F. and is in highly liquid condition at about 170° F. which is the temperature I prefer to employ in the coating of containers formed of relatively thin paper, such as shown in the drawings. The container is immersed in such manner that the paraffin has access to all surfaces, both interior and exterior, and is maintained in the bath until the paraffin has had opportunity to partially penetrate into the interstices between the paper fibers. When the paper employed in the manufacture of the cartons is pure bleached sulphite paper about .016" or .017" in thickness, an immersion of approximately ten seconds will produce satisfactory results.

The container is next removed from the bath and the excess paraffin drained therefrom. Preferably the bottom is elevated so that the container is disposed at an angle of about 25° to the horizontal. With paper of the type described and where paraffin is used as the coating substance, I find it desirable to allow the container to remain in this position for approximately eighteen seconds, drainage for this period of time insuring that excess amounts of paraffin are removed and only that amount retained which it is desired shall be present upon the walls of the completed carton. The draining operation is carried out in a chamber or space in which the temperature of the atmosphere and of all parts which may contact with the carton is well above the melting point of the paraffin. Naturally, at the completion of the draining operation, the paraffin coating is much heavier at the lower end of the carton, i. e., the open end, than it is at the upper or closed end, and in Figure 3 of the drawings it is so shown, the paraffin coating being indicated at 15.

Immediately after the completion of the draining operation, the carton is removed from the heated draining chamber or space and is disposed vertically in a chamber or space of normal room temperature with its bottom resting upon a heated base, such for instance as two parallel pipes indicated at 16 in Figures 4 and 5 through which is circulated some heating medium. Against the top portion of the container or the foldable end thereof, a current of chilled or refrigerated air is directed, as indicated in Figure 4, this air being delivered from the mouth of a conduit diagrammatically shown at 17 and passing directly over and around the carton's foldable end, the purpose of this air current being to chill the relatively large quantity of coating material upon the walls of the foldable end of the carton and to congeal the same before it has had opportunity to run downwardly along the side walls and toward the bottom of the container.

The air surrounding the remainder of the container, being at room temperature, naturally tends to congeal and solidify the coating material upon all surfaces thereof but, due to the fact that the container is at this time resting upon a heated base 16, solidification of that portion of the coating material upon the bottom and adjacent portions of the side walls is retarded so that the "waves" 18 of coating material (Figure 4), which naturally tend to flow down the side walls thereof and which would otherwise solidify in wave formation, are caused to continue to flow toward the bottom and will blend together to leave a smooth neat exterior surface, which is highly desirable. When the waves have all converged and flowed together, the container is placed within a cooling chamber, preferably by being advanced along the spaced heated pipes 16, in which a current of mechanically refrigerated air moving at high velocity is circulated around the same, which refrigerated air quickly sets all of the coating material on the outside of the container. At this time the coating on the outside of the container is relatively thick adjacent the top thereof, tapers gradually toward the middle of the container, and thence increases in thickness gradually toward the bottom of the container, as shown in Figure 5.

From the time the container has emerged from the hot draining chamber until the time it enters the refrigerating chamber (diagrammatically indicated at 20), its interior has not changed greatly in temperature except at the extreme upper portion of the top, due to the latent heat in the container and its material and also due to the low thermal conductivity of the container material and to the moderate temperature surrounding the container. Therefore, a steady gradual flow of coating material flows downward inwardly of the container off of the side walls and onto the bottom. During this time also the bottom of the container rests upon the heating elements 16 which maintain the bottom thereof at a temperature slightly above the melting point of the paraffin, which permits and facilitates an even distribution of coating material over the inside bottom surfaces, but when the container enters the refrigerating chamber shown in Figure 5, the liquid coating flowing down the side walls and inside of the container congeals, immediately halting the downward flow of coating material. The bottom of the container, however, does not cool so rapidly due to its three-ply thickness and the comparatively heavy layer of coating thereon. Some of the latent heat of this hot bottom is conducted to the side walls directly above the bottom, retaining a higher temperature at the intersection of the side walls with the bottom which tends to prolong the flow of coating into the corners of the container. This prolonged flow of coating during the rapid cooling of the exterior of the container, together with capillary attraction of the liquid coating up the side walls, produces substantial fillets of coating material in all horizontal and vertical inside corners of the bottom of the container. Continued stay of the container in the cooling chamber, however, results in all the latent heat of the board and coating material being dissipated, and eventually the coating material on all portions of the container is firmly and effectually solidified so that no materials which it may later contain, whether solids or liquids, may find an aperture through which to escape.

After the container is thus coated in the manner just described, its bottom is treated for the removal of excess coating material which has naturally tended to deposit itself thereon. In Figure 6 one method of efficiently removing this excess coating is indicated. A container having on its bottom excess coating material, for instance the left-hand container shown in Figure 6, is moved across a heated conduit such as indicated at 21, this conduit being sufficiently hot to rapidly melt the coating material which comes in contact with it and to remove the same from the bottom of the box. The coating material thus removed is collected in a trough 22.

After this last mentioned operation has been carried out, the container is ready for charging and is removed to a charging machine or apparatus where it is filled with material which it is desired to package, as for instance granular or powdered material or liquid material such as milk. The charging apparatus forms no part of the present invention and therefore need not be specifically illustrated and described. Any suitable apparatus may be employed for this purpose or, of course, the charging may be accomplished by hand.

After the container is charged, the closing and sealing operations remain to be performed. In closing and sealing the container the coating material upon the surfaces of its top or foldable end is first softened by the application of heat. Conveniently the container may be moved along with its foldable top in close proximity to heating pipes such as indicated at 23 in Figure 7. The heat transmitted to the coating by the heating means is sufficient to reduce the paraffin to at least a viscous or flowable state. Thereafter, and while the coating material is in this flowable state, the foldable top portions of the container are collapsed or folded together so that the upper end of the container is as shown in Figure 8, a final stitching operation being preferably performed upon the central rib and a stitch 24 passed through the rib to firmly hold the various sections of the foldable top together. By bringing the several portions of the foldable top into contact with each other while the coating material thereon is in molten or flowable condition, a perfect bond between the several elements is obtained, and, as a result of initially forming the carton with an excess of coating material at its foldable end, there is ample coating material available to completely seal any spaces which otherwise might permit leakage. In fact, by the operation just described, a complete continuous seal for the contents of the container is provided both interiorly and exteriorly of the container proper. The mechanism for folding the collapsible top of the container forms no part of the present invention, and any suitable mechanism may be provided. Also the actual folding operations may be performed in stages and heat applied to the foldable end several times if necessary. In fact it has been found desirable to first partially collapse the foldable end portion of the container and to then apply heat prior to the final folding operation. Heat may be applied after the final operation if desired, and, while the coating material is still flowable or plastic, the central rib may be subjected to pinching or compression.

Practice of the method just described results in a superior type of carton. By distributing the coating material in such manner that there is ample material where it is needed, i. e., at the top and bottom of the carton, and a minimum of material where such material is not needed, i. e., toward the center of the carton, economy in the use of paraffin or other such material is effected. By causing the coating material to be deposited in a comparatively thick layer toward the bottom of the container both interiorly and exteriorly, this bottom portion is reinforced as the coating material itself imparts additional strength to the paper. This enables the container to successfully withstand internal pressure of liquids without bulging even though the paper itself is of comparatively light weight. Also, by providing relatively substantial fillets of coating material in the interior corners of the carton, additional protection against the possibility of leakage is provided, and particularly leakage due to possibly poor folding operations is prevented. Finally, by the coating method just described, involving the use of the application of heat to the lower end of the container in the manner specified, puddles of coating are prevented from colecting on the bottom of the container interiorly thereof. Should puddles of coating material collect and harden, there is great likelihood that such material will flake off or become detached and float up into the contents of the container when it is charged with liquid.

Having thus described the invention, what is claimed as new and desired to be secured by Letters Patent is:

1. The method of fabricating a sealed container which comprises forming a container with a foldable end, immersing the container in a coating liquid which solidifies at ordinary temperatures, withdrawing the container and draining the same, and subjecting the foldable end to the action of a cooling medium to solidify the coating liquid covering this end more rapidly than the coating liquid upon other portions of the container.

2. The method of fabricating a sealed container which comprises forming a tubular container with one closed end and one open end, the open end being foldable for sealing purposes, immersing the entire container in a heated coating liquid which solidifies at ordinary temperatures, withdrawing the container from the liquid and draining the same, erecting the container with its foldable end uppermost, and subjecting the foldable end to the action of a cooling medium so as to solidify the coating liquid covering this end more rapidly than the coating liquid upon other portions of the container.

3. The method of fabricating a sealed container which comprises forming a tubular container with one closed end and one open end, the open end being foldable for sealing purposes, immersing the entire container in a heated coating liquid which solidifies at ordinary temperatures, withdrawing the container from the liquid and draining the same by maintaining the open end lowermost in a chamber heated to a temperature greater than that at which the coating liquid solidifies, removing the container from the heated chamber and erecting the same so that the foldable end is uppermost, and subjecting the foldable end of the container to the action of a cooling medium so as to solidify the coating liquid thereon more rapidly than the coating liquid upon other portions of the container.

4. The method of fabricating a sealed container which includes the steps: forming the container with an open end which may be folded; coating the entire container with a heated liquid which solidifies at normal temperature; and cooling and solidifying that portion of the coating upon the open end more rapidly than the coating upon the other portion of the container.

5. The method of fabricating a sealed container which includes the steps: forming a tubular container with a foldable open end and a closed end, coating the entire container with a heated liquid which solidifies at normal temperature; and rapidly cooling and solidifying that portion of the coating upon the foldable end portion of the container while the coating upon the remaining portions remains in flowable condition.

6. The method of fabricating a sealed container which comprises forming a tubular container with a foldable open end and a closed end, coating the entire container with a heated liquid which solidifies at normal temperatures, disposing the container with the open end uppermost, and subjecting the foldable end of the container to the action of a cooling medium while the bottom is subjected to heat.

7. The method of fabricating a sealed container which comprises forming a tubular container with a foldable open end and a closed end, coating the entire container with a heated liquid which solidifies at normal temperature, disposing the container with its foldable end uppermost, and applying heat to the lower portion of the container to delay solidification of the coating liquid toward the lower end of the container while the liquid upon the top portion solidifies.

8. The method of fabricating a sealed container which includes the steps: forming the container with an open end which may be folded; coating the container with a heated liquid which solidifies at normal temperature, a greater quantity of such liquid being deposited upon the foldable end than upon the remainder of the container; positioning the container with its foldable end uppermost while the liquid remains in flowable condition; quickly chilling the foldable end to solidify the heavier liquid coating thereon and thereafter solidifying the remainder of the liquid coating; charging the container; softening the coating material upon the foldable end of the container by the application of heat; and closing the foldable end of the container by a folding operation while the coating is in softened condition, thereby sealing the same.

9. The method of fabricating a sealed container comprising forming the container with an open end and a closed end, coating the same with a heated liquid which solidifies upon cooling, disposing the container with its closed end downward, retarding solidification of the coating material at and adjacent the lower end of the container by the application of heat and thereby facilitating flow of such material toward the bottom of the container, and thereafter permitting complete solidification of the coating material.

10. A self supporting, completely closed and sealed, tubular paper container comprising a side wall, bottom closure and top closure, said container having a complete continuous coating of a sealing substance in solid form closely adhering to its inner surfaces, the thickness of said coating at and adjacent the top and bottom closure portions being greater than the thickness of said coating upon the side wall midway of the top and bottom.

11. A self supporting, completely closed and sealed, tubular paper container comprising a side wall, bottom closure and top closure, said container having a complete continuous coating of a sealing substance in solid form closely adhering to its inner surfaces, and a similar coating closely adhering to its outer surfaces, the thickness of each such coating being greater at and adjacent the top and bottom closure portions than the thickness of the same coating upon the side wall midway of the top and bottom.

HENRY T. SCOTT.